US008508404B1

United States Patent
Wilmhoff (10) Patent No.: US 8,508,404 B1
(45) Date of Patent: Aug. 13, 2013

(54) FUZE SYSTEM THAT UTILIZES A REFLECTED GPS SIGNAL

(75) Inventor: Benjamin R. Wilmhoff, Denver, CO (US)

(73) Assignee: FIRST RF Corporation, Boulder, CO (US)

( * ) Notice: Subject to any disclaimer, the term of this patent is extended or adjusted under 35 U.S.C. 154(b) by 192 days.

(21) Appl. No.: 13/175,758

(22) Filed: Jul. 1, 2011

(51) Int. Cl.
*G01S 19/18* (2010.01)

(52) U.S. Cl.
USPC .................................................. 342/357.56

(58) Field of Classification Search
USPC ................ 342/357.4, 357.56, 453; 244/3.15, 244/3.19; 701/4
See application file for complete search history.

(56) References Cited

U.S. PATENT DOCUMENTS

| 6,237,496 B1 | 5/2001 | Abbott |
| 6,254,031 B1 | 7/2001 | Mayersak |
| 6,256,559 B1 | 7/2001 | Tsui |
| 7,098,841 B2 | 8/2006 | Hager et al. |
| 7,121,210 B2 | 10/2006 | Steele |
| 7,219,589 B2 | 5/2007 | Gibson et al. |
| 7,533,612 B1 | 5/2009 | Papayianis et al. |
| 2010/0070111 A1 | 3/2010 | Akcasu |

OTHER PUBLICATIONS

Michael de Vries, GPS Based Bistatic Radar—Beyond Specular Reflection, The 24th Digital Avionics Systems Conference, Oct. 30, 2005, pp. 4.E.2-1 through 4.E.2-12, vol. 1, IEEE.

D. Masters et al., A Passive GPS Bistatic Radar Altimeter for Aircraft Navigation, Proceedings of the 14th International Technical Meeting of the Satellite Division of the Institute of Navigation, Sep. 11-14, 2001, pp. 2435-2445, The Institute of Navigation.

*Primary Examiner* — Dao Phan
(74) *Attorney, Agent, or Firm* — Christopher J. Kulish (57) ABSTRACT

The present invention is directed to fuze system for munition that produces a height-of-burst (HOB) signal using two Global Positioning System (GPS) signals, the first signal being from a particular GPS satellite (the direct GPS signal) and the second signal being the GPS signal from the same GPS satellite after the signal has been reflected from the surface adjacent to the target. In one embodiment, the HOB signal is generated when there is a substantial correlation between the reflected GPS signal and direct GPS delayed by an amount of time that is indicative of the desired HOB.

18 Claims, 6 Drawing Sheets

FUZE SYSTEM THAT UTILIZES A REFLECTED GPS SIGNAL

STATEMENT REGARDING FEDERALLY SPONSORED RESEARCH

This invention was made with Government support under Contract FA8651-05-C-0109 awarded by the Department of the Air Force. The Government has certain rights in the invention.

FIELD OF THE INVENTION

The present invention relates to a fuze system that provides a detonation signal at a desired height above the surface associated with a target.

BACKGROUND OF THE INVENTION

Munitions come in several forms. There are munitions that are launched from airborne platforms, submerged platforms, surface ships, artillery, and tanks to name a few. Regardless of the platform from which a munition is launched, the munition must be guided to the desired target. In many instances, the guidance is largely determined by the conditions imposed upon a munition at the point of launching. For instance, the guidance of a bomb dropped from a bomber during WWII was substantially determined by the speed and altitude of the bomber at the point in time when the bomb was released. The released bomb had little, if any, ability to guide itself to a desired target after being released. Hence, such bombs are typically referred to as "dumb bombs." More recently, many munitions include guidance systems that, if needed, direct the munition to the desired target by providing appropriate signals to control surfaces associated with the munition. Examples of such munitions are cruise missiles and Joint Direct Attack Munition (JDAM) smart bombs. Many of these guidance systems employ inertial navigation and Global Positioning System (GPS) receivers in guiding the munition to the desired target.

In many instances, the effectiveness of the munition depends not only on being guided to the target but also on detonating at a desired height above the target, which is frequently referred to as height-of-burst (HOB). Generally, there are two types of HOB fuze systems associated with a munition. In the first type of HOB fuze system, the period of time required for the munition to move between a reference point in the anticipated flight path (e.g., the launch point) and the desired HOB point is calculated. Upon expiration of the calculated period of time, the fuze causes a detonation signal to be issued. The calculation is typically quite complicated and may take into account factors such as the launch location, target location, ballistic trajectory, speed of the munition at launch, meteorological conditions etc.

The second type of HOB fuze system that is associated with munitions employs a transmitter and a receiver. The transmitter produces a signal that is directed to and reflected from a surface associated with the target. The receiver receives the reflected signal. Based on the time elapsed between the transmission of the signal and the reception of the reflected signal, the system can calculate the height of the munition above the surface and issue a detonation signal if the munition is at or near the desired HOB. Due to the presence of a transmitter, such systems are typically referred as "active" HOB fuze systems.

SUMMARY OF THE INVENTION

The present invention is directed to a passive HOB fuze system that does not associate a transmitter with the munition. Rather, the passive HOB fuze system of the present invention utilizes two Global Position System (GPS) signals to determine when to issue a HOB signal to cause the munition to detonate or the muntion's payload to be deployed. The first GPS signal being a direct GPS signal from a particular GPS satellite, i.e. a GPS signal that has traveled from the GPS satellite to an antenna associated with the fuze system without having been reflected by the surface of the earth. The second GPS signal being a reflected GPS signal that is a GPS signal from the same satellite after having been reflected by the surface of the earth in the vicinity of the target. The reflected GPS signal will have traveled over a longer path than the direct GPS signal in reaching the munition. Relatedly, the reflected GPS signal will have taken a greater amount of time to reach the munition than the direct GPS signal. This longer path and greater amount of time are used by the fuze system in determining when to issue the HOB signal. In one embodiment, the HOB signal is generated when there is a substantial correlation between the reflected GPS signal and the direct GPS delayed by an amount of time that is directly related to the desired HOB. This approach should be contrasted with an approach that constantly or repeatedly determines the height of the munition relative to the underlying surface and compares the determined height to the desired HOB, as is done in some altimeter applications. The correlation approach avoids the constant or repeated calculation of the height of the munition above the surface of the earth. Further, by avoiding such calculations, the correlation approach is capable of being more readily adapted to munitions traveling at greater speeds or munitions constrained to using commercial or military GPS receivers with slow PRN averaging times than the approach that constantly or repeatedly calculates the height of the munition.

DETAILED DESCRIPTION

Generally, the HOB fuze system of the present invention relies upon the difference between the distance that a "direct"

GPS signal transmitted by a GPS satellite travels in reaching an airborne munition at a desired HOB and the distance that a "reflected" GPS signal transmitted by the same GPS satellite travels in reaching the airborne munition at the desired HOB. A direct GPS signal is a GPS signal that is received at an airborne munition without having been reflected by an earth surface (e.g., land, water, snow, ice etc.). A reflected GPS signal is a GPS signal that is received at an airborne munition that has been reflected by an earth surface before being received at the munition. The direct GPS signal travels a lesser distance than the reflected GPS signal in reaching the airborne munition. The velocities of the direct and reflected GPS signals are substantially the same and are each approximately the speed of light. Consequently, there is also a difference in the amount of time that a particular point in the direct GPS signal takes to reach the airborne munition at the HOB and the time that a corresponding point in the reflected GPS signal takes to reach the airborne munition at the HOB. The HOB fuze system determines and uses this time difference in determining when to issue an HOB signal.

The calculation of the difference in the distances traveled by a direct and reflected GPS signals from a specific GPS satellite in reaching an airborne munition (hereinafter "$\Delta d$") at the desired HOB (hereinafter "h") and the calculation of the related time difference (hereinafter "$\Delta t$") are dependent upon the angle of the GPS satellite relative to a vertical line (hereinafter "$\theta$"). More specifically, the calculations of $\Delta d$ and $\Delta t$ change for the following values of $\theta$:

$$\pi/4 < \theta < \pi/2 \quad (1)$$

$$\theta = \pi/4 \quad (2)$$

$$0 < \theta < \pi/4 \quad (3)$$

$$\theta = 0 \quad (4)$$

The calculations of $\Delta d$ and $\Delta t$ for each of these values of $\theta$ are hereinafter described. These calculations are based on particular trigonometric relationships. It may be possible that trigonometric relationships other than those described and known to those skilled in the art could be employed in making the calculations. As such, the invention is not necessarily limited to the use of any particular trigonometric relationships or particular sequence of calculations.

Figure 1A:
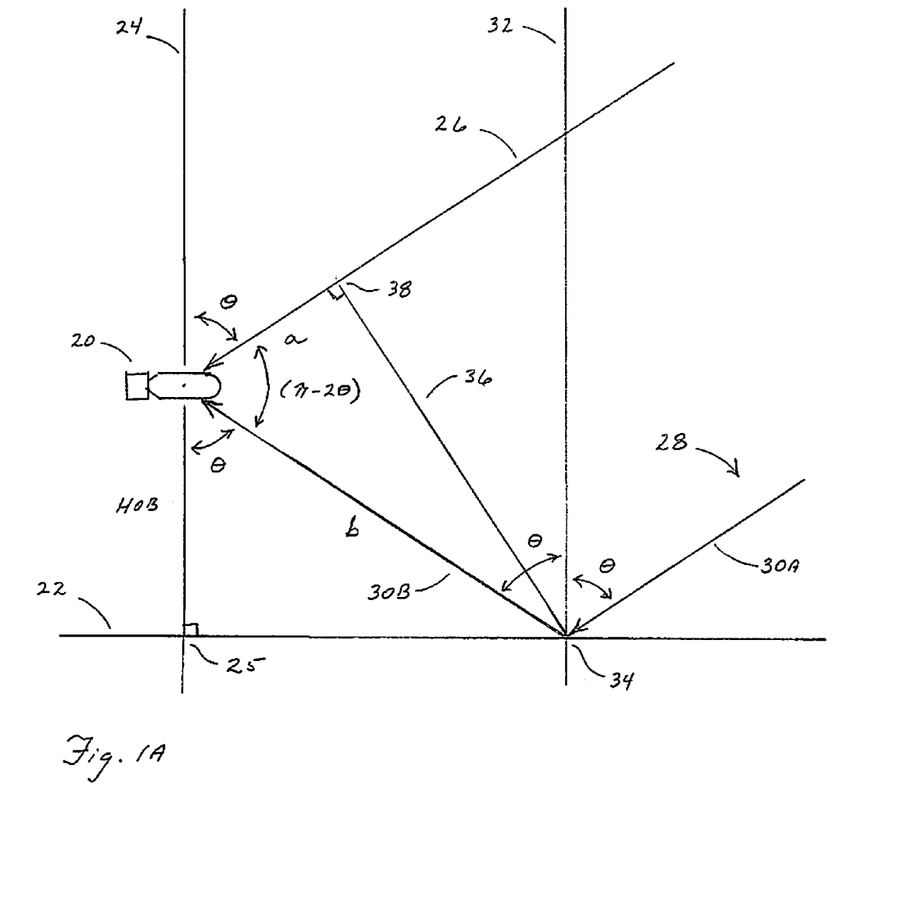
FIGS. 1A-1C each illustrates an airborne munition with the fuze system at the desired HOB for the munition, a portion of the path traveled by the direct GPS signal transmitted by a GPS satellite and received by the fuze system, a portion of the path traveled by the reflected GPS signal transmitted by the same GPS satellite and received by the fuze system, and various geometric/trigonometric relationships between the paths of the two signals that relate to the HOB and that use an angle $\theta$ that represents the angle between a direct GPS signal and a vertical line relative to the earth's surface.

With reference to FIG. 1A, a method for determining $\Delta d$ and $\Delta t$ when $\theta$ is greater than $\pi/4$ and less than $\pi/2$ for a given HOB is described. At the outset, for the purpose of describing these calculations, the following assumptions are made: (a) the earth surface from which the reflected GPS signal is reflected is flat, (b) the vertical line relative to which $\theta$ is measured is normal to the earth surface, (c) the earth surface reflects the reflected GPS signal such that the angle of incidence is equal to the angle of reflection; (d) the direct and reflected GPS signals are substantially parallel to one another, (e) $\theta$ is known (and is provided in or derived from the GPS signal), and (f) the desired HOB is known. The direct and reflected GPS signals can be considered to be substantially parallel to one another because the GPS satellite that is the source of the signals can be considered a very distant point source. In this regard, each GPS satellite orbits in a range of 20,000-25,000 km from the earth's surface. With the foregoing in mind, an airborne munition 20 is located above an earth surface 22 and at a height above the earth surface that, when measured from a point 25 at which the vertical line 24 intersects the earth surface 22 to the munition 20, is the desired HOB for the munition 20. The munition receives a direct GPS signal 26 and a reflected GPS signal 28. The direct and reflected GPS signals 26, 28 are substantially parallel to one another. The reflected GPS signal 28 has pre-reflection portion 30A and post-reflection portion 30B. The post-reflection portion 30B has a length of "b". A vertical line 32 that is parallel to vertical line 24 passes through a point 34 at which the reflected GPS signal 28 transitions between the pre-reflection portion 30A and the post-reflection portion 30B. The direct GPS signal 26 is at the angle $\theta$ relative to the vertical line 24. The pre-reflection portion 30A of the reflected GPS signal is also at angle $\theta$ relative to vertical line 32. The post-reflection portion 30B of the reflected GPS signal is also at angle $\theta$ relative to vertical line 32, due to the angle of incidence being equal to the angle of reflection. The angle between the post-reflected portion 30B of the reflected GPS signal 28 and the vertical line 24 is also $\theta$. As such, the angle between the post-reflect portion 30B of the reflected GPS signal and the direct GPS signal 26 is ($\pi$–2$\theta$). A line 36 is perpendicular to the direct GPS signal 26 and passes through the point 34 and a point 38 associated with the direct GPS signal 26. The portion of the direct GPS signal 26 that extends from the point 38 to the munition 20 has a length of "a". The difference in the distances traveled by the direct and reflected GPS signals in reaching the munition 20 at the desired HOB is:

$$\Delta d = b - a \quad (5)$$

The distance "a" can be represented as:

$$a = b \cos(\pi - 2\theta) \quad (6)$$

Substitution of equation (6) into equation (5) yields:

$$\Delta d = b(1 - \cos(\pi - 2\theta)) \quad (7)$$

The HOB (hereinafter "h") can be represented as:

$$h = b \cos \theta \quad (8)$$

Rewriting equation (8) to determine b yields:

$$b = h/\cos \theta \quad (9)$$

Substituting equation (9) into equation (7) yields:

$$\Delta d = h(1 - \cos(\pi - 2\theta))/\cos \theta \quad (10)$$

The difference in distance can be represented as:

$$\Delta d = v \Delta t \quad (11)$$

where v is the speed of light and $\Delta t$ is the difference in the travel times of the direct and reflected GPS signals 26, 28. Substituting equation (11) into equation 10 and solving for $\Delta t$ yields:

$$\Delta t = h(1 - \cos(\pi - 2\theta))/v \cos \theta \quad (12)$$

Figure 1B:
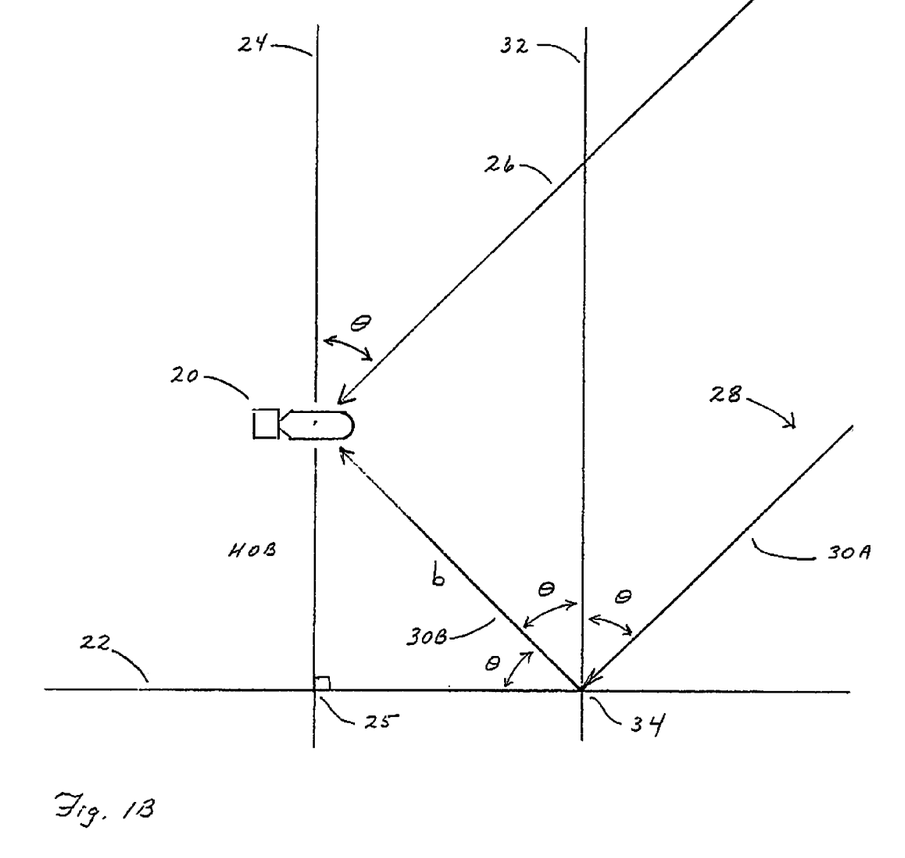

With reference to FIG. 1B, a method for determining $\Delta d$ and $\Delta t$ when $\theta$ is or is substantially equal to $\pi/4$ for a given HOB is described. The assumptions noted with respect to FIG. 1A are also applicable in the case. Further, certain reference numbers associated with FIG. 1A are retained in FIG. 1B. In this regard, the munition 20 is located above an earth surface 22 and at a height above the earth surface that, when measured from a point 25 at which the vertical line 24 intersects the earth surface 22 to the munition 20, is the desired HOB for the munition 20. The airborne munition 20 receives a direct GPS signal 26 and a reflected GPS signal 28. The direct and reflected GPS signals 26, 28 are substantially parallel to one another. The reflected GPS signal 28 has pre-reflection portion 30A and post-reflection portion 30B. The post-reflection portion 30B has a length of "b". A vertical line 32 that is parallel to vertical line 24 passes through a point 34 at which the reflected GPS signal 28 transitions between the pre-reflection portion 30A and the post reflection portion 30B. The direct GPS signal 26 is at the angle θ relative to the vertical line 24. The pre-reflection portion 30A of the reflected GPS signal is at angle θ relative to vertical line 32. The post-reflection portion 30B of the reflected GPS signal is also at angle θ relative to vertical line 32. In this case, the difference in the distances traveled by the direct and reflected GPS signals in reaching the airborne munition 20 at the desired HOB is:

$$\Delta d = b \quad (13)$$

Further, because θ is equal to π/4, the triangle with vertices defined by the munition 20, point 25, and point 34 is an isosceles right triangle. As such, the distance between points 25 and 34 is equal to the HOB (hereinafter "h"). Application of the Pythagorean Theorem results in:

$$b^2 = h^2 + h^2 \quad (14)$$

Solving for b results in:

$$b = (2h^2)^{1/2} \quad (15)$$

Substitution of equation (13) into equation (15) yields $$\Delta d = (2h^2)^{1/2} \quad (16)$$

The difference in distance can be represented as:

$$\Delta d = v \Delta t \quad (17)$$

where v is the speed of light and Δt is the difference in the travel times of the direct and reflected GPS signals 26, 28. Substitution of equation (17) into equation (16) yields:

$$v\Delta t = (2h^2)^{1/2} \quad (18)$$

Solving equation (18) for Δt yields:

$$\Delta t = (2h^2)^{1/2}/v \quad (19)$$

Figure 1C:
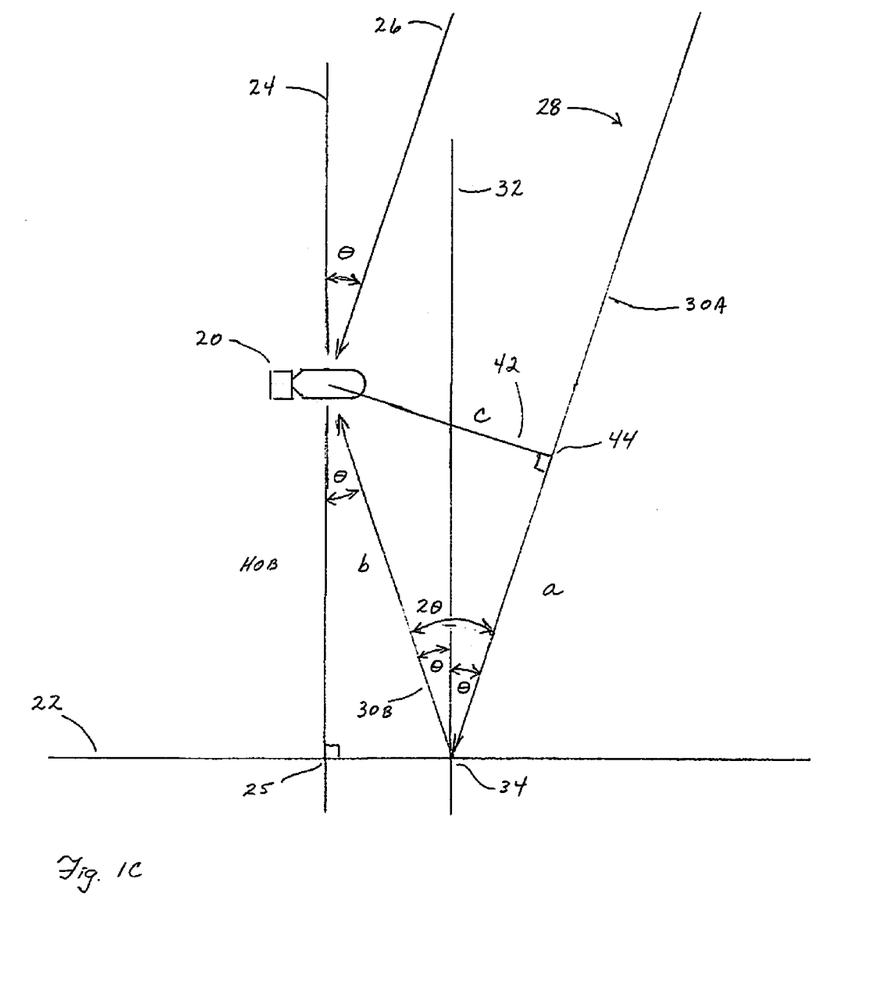

With reference to FIG. 1C, a method for determining Δd and Δt when θ is greater than 0 and less than π/4 for a given HOB is described. The assumptions noted with respect to FIG. 1A are also applicable in the case. Further, certain reference numbers associated with FIG. 1A are retained in FIG. 1B. In this regard, the munition 20 is located above an earth surface 22 and at a height above the earth surface that, when measured from a point 25 at which the vertical line 24 intersects the earth surface 22 to the munition 20, is the desired HOB for the munition 20. The airborne munition 20 receives a direct GPS signal 26 and a reflected GPS signal 28. The direct and reflected GPS signals 26, 28 are substantially parallel to one another. The reflected GPS signal 28 has pre-reflection portion 30A and post-reflection portion 30B. The post-reflection portion 30B has a length of "b". A vertical line 32 that is parallel to vertical line 24 passes through a point 34 at which the reflected GPS signal 28 transitions between the pre-reflection portion 30A and the post reflection portion 30B. The direct GPS signal 26 is at the angle θ relative to the vertical line 24. The pre-reflection portion 30A of the reflected GPS signal is also at angle θ relative to vertical line 32. The post-reflection portion 30B of the reflected GPS signal is also at angle θ relative to vertical line 32, due to the angle of incidence being equal to the angle of reflection. The angle between the post-reflected portion 30B of the reflected GPS signal 28 and the vertical line 24 is also θ. A line 42 is perpendicular to the pre-reflected portion 30A of reflected GPS signal 28 and intersects the munition 20 and a point 44 associated with the pre-reflected portion 30A of reflected GPS signal 28. The portion of the GPS signal 26 that extends from point 34 to point 44 has a length of "a". In this case, the difference in the distances traveled by the direct and reflected GPS signals in reaching the airborne munition 20 at the desired HOB is:

$$\Delta d = a + b \quad (20)$$

The angle between pre-reflected and post-reflections portions 30A, 30B of the reflected GPS signal 28 is 2θ. As such, the distance "a" can be represented as:

$$a = b \cos 2\theta \quad (21)$$

Substitution of equation (21) into equation (20) yields:

$$\Delta d = b(1 + \cos 2\theta) \quad (22)$$

The HOB (hereinafter "h") can be represented as:

$$h = b \cos \theta \quad (23)$$

Solving equation (23) for b yields:

$$b = h/\cos \theta \quad (24)$$

Substitution of equation (24) into equation (22) yields:

$$\Delta d = h(1 + \cos 2\theta)/\cos \theta \quad (25)$$

The distance Δd can be represented as:

$$\Delta d = v \Delta t \quad (26)$$

where v is the speed of light and Δt is the difference in the travel times of the direct and reflected GPS signals 26, 28. Substitution of equation (26) into equation (25) yields:

$$v\Delta t = h(1 + \cos 2\theta)/\cos \theta \quad (27)$$

Solving equation (27) for Δt results in:

$$\Delta t = h(1 + \cos 2\theta)/v \cos \theta \quad (28)$$

A method for determining Δd and Δt when θ is or is substantially equal to 0 for a given HOB is described. In this case, the determination of Δd is:

$$\Delta d = 2h \quad (29)$$

The distance Δd can be represented as:

$$v \Delta t = 2h \quad (30)$$

Solving equation (30) for Δt results in:

$$\Delta t = 2h/v \quad (31)$$

Figure 2:
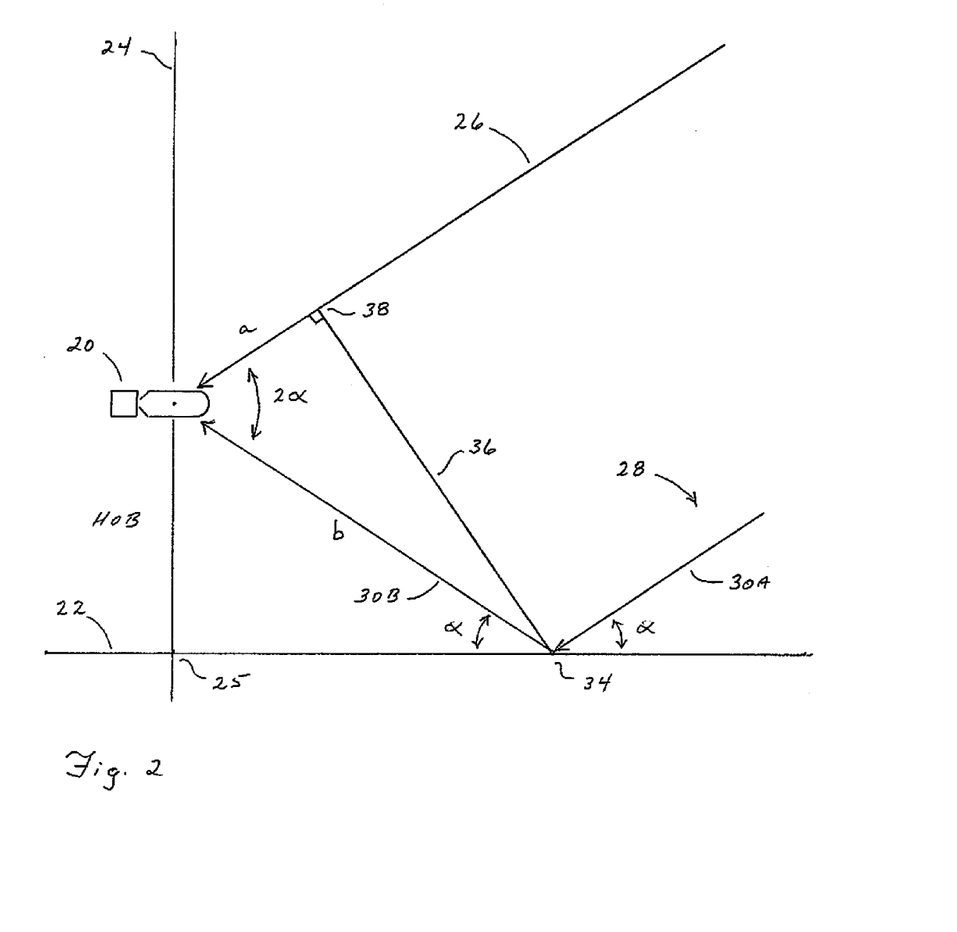
FIG. 2 illustrates an airborne munition with the fuze system at the desired HOB for the munition a portion of the path traveled by the direct GPS signal transmitted by a GPS satellite and received by the fuze system, a portion of the path traveled by the reflected GPS signal transmitted by the same GPS satellite and received by the fuze system, and various geometric/trigonometric relationships between the paths of the two signals that relate to the HOB and using an angle $\theta$ that represents the angle between a direct GPS signal and a horizontal line parallel to the earth's surface.

The prior equations for determining Δd and Δt are based on θ being the angle between the direct GPS signal 26 the vertical line 24 relative to the earth's surface 22. With reference to FIG. 2, Δd and Δt can also be determined based on the angle α between the direct GPS signal 26 and the earth's surface 22 in the vicinity of the target. The angle α is known and provided in or derived from the GPS signal. One advantage associated with using the angle α instead of the angle θ is that the determination of Δt requires only one equation for all values of α that are equal to or greater than 0 and less than π/2.

For the purpose of describing the calculation of Δt based on the angle α, the following assumptions are made: (a) the earth surface from which the reflected GPS signal is reflected is flat, (b) the earth surface reflects the reflected GPS signal such that the angle of incidence is equal to the angle of reflection; (c) the direct and reflected GPS signals are substantially parallel to one another, (e) α is known (and is provided in or derived from the GPS signal), and (f) the desired HOB is known. Further, certain reference numbers associated with FIG. 1A are retained in FIG. 2. In this regard, the munition 20 is located above an earth surface 22 and at a height above the earth surface that, when measured from a point 25 at which the vertical line 24 intersects the earth surface 22 to the munition 20, is the desired HOB for the munition 20. The airborne munition 20 receives a direct GPS signal 26 and a reflected GPS signal 28. The direct and reflected GPS signals 26, 28 are substantially parallel to one another. The reflected GPS signal 28 has pre-reflection portion 30A and post-reflection portion 30B. The post-reflection portion 30B has a length of "b". Point 34 is the point at which the reflected GPS signal 28 transitions between the pre-reflection portion 30A and the post reflection portion 30B. A line 36 is perpendicular to the direct GPS signal 26 and passes through the point 34 and a point 38 associated with the direct GPS signal 26. The portion of the direct GPS signal 26 that extends from the point 38 to the munition 20 has a length of "a".

With continuing reference to FIG. 2 and unlike FIG. 1A, the direct GPS signal 26 is at the angle α relative to the earth surface 22; the pre-reflection portion 30A of the reflected GPS signal is also at angle α relative to the earth surface 22; and the post-reflection portion 30B of the reflected GPS signal is also at angle α relative to the earth surface 22, due to the angle of incidence being equal to the angle of reflection. Further, the angle between the direct GPS signal 26 and the post-reflected portion 30B of the reflected GPS signal 28 is 2α.

With continuing reference to FIG. 2, the difference in the distances traveled by the direct and reflected GPS signals in reaching the munition 20 at the desired HOB is:

$$\Delta d = b - a \quad (32)$$

The distance "a" can be represented as:

$$a = b \cos 2\alpha \quad (33)$$

Substitution of equation (33) into equation (32) yields:

$$\Delta d = b(1 - \cos 2\alpha) \quad (34)$$

The HOB (hereinafter "h") can be represented as:

$$h = b \sin \alpha \quad (35)$$

Rewriting equation (35) to determine b yields:

$$b = h/\sin \alpha \quad (36)$$

Substituting equation (36) into equation (34) yields:

$$\Delta d = h(1 - \cos 2\alpha)/\sin \alpha \quad (37)$$

The difference in distance can be represented as:

$$\Delta d = v \Delta t \quad (38)$$

where v is the speed of light and Δt is the difference in the travel times of the direct and reflected GPS signals 26, 28. Substituting equation (38) into equation (37) and solving for Δt yields:

$$\Delta t = h(1 - \cos 2\alpha)/v \sin \alpha \quad (39)$$

Figure 3:
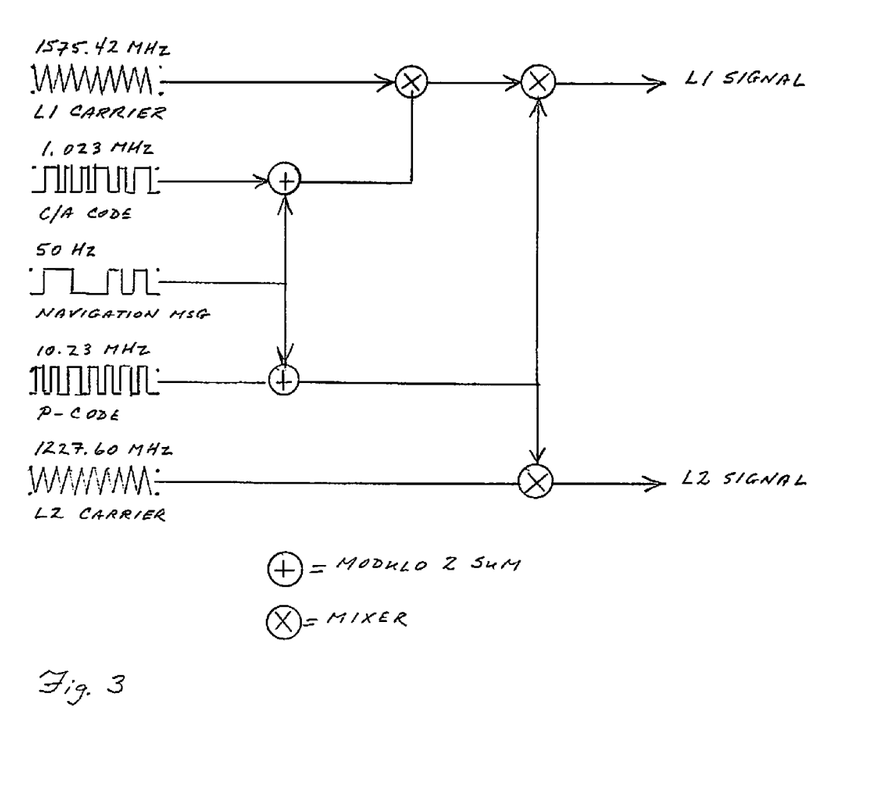
FIG. 3 is a schematic illustration of the L1 and L2 signals transmitted by a GPS satellite and the components of the L1 and L2 signals.

The foregoing has shown that there is a time difference between the direct and reflected GPS signals received by an airborne munition that corresponds to a desired HOB. However, to determine if the desired time difference exists between the direct and reflected GPS signals there needs to be an identifiable point in or section of the direct and reflected GPS signals whose arrivals at the airborne munition can be identified and used to determine if the difference in arrivals times is indicative of the munition being at or near the desired HOB. The GPS signals transmitted by a GPS satellite provide an identifiable point or section that can be used to determine if the time difference between the direct and reflected GPS signals received by the munition is indicative of the munition being at or near the desired HOB. To elaborate and with reference to FIG. 3, each GPS satellite presently transmits two carrier signals in the L-Band between 1000 and 2000 MHz. More specifically, each GPS satellite transmits one carrier signal at 1575.42 MHz (designated L1) and a second carrier signal at 1227.60 MHz (designated L2). Each of the L1 and L2 carrier signals is modulated. The L1 carrier is modulated by: (a) a coarse acquisition code (C/A-code) that is a pseudo-random digital code with a frequency of 1.023 MHz, (b) a precision code (P-code) that is another pseudo-random digital code with a frequency of 10.23 MHz, and (c) a navigation message that provides timing information, emphemeris or satellite orbit information, and an almanac with status and error correction information, among other things. In this regard, the navigation signal provides one of the α and θ angles or provides data/information from which a desired one of α and θ can be determined. The L2 carrier is modulated by: (a) the P-code and (b) the navigation message. Both the C/A-code and the P-code transmitted by a GPS satellite are unique to that particular GPS satellite. Further, both the C/A-code and the P-code, due to their pseudo-random characteristics, provide an identifiable point or portion of the GPS signal that can be used to determine the difference in arrival times of the direct and reflected GPS signals at the airborne munition and are indicative of the munition being at the desired HOB. Both the C/A-code and the P-code are digital signals that have periods of time during which the signal is in a 1-state or a 0-state. In GPS parlance, this period of time is referred to as a "chip," which is the equivalent of a "bit" in other digital contexts. A "chip" being a period of time during which the GPS signal is in either a 1-state or 0-state can also be equated to a distance over which a GPS signal is in either the 1-state or 0-state.

Figure 4:
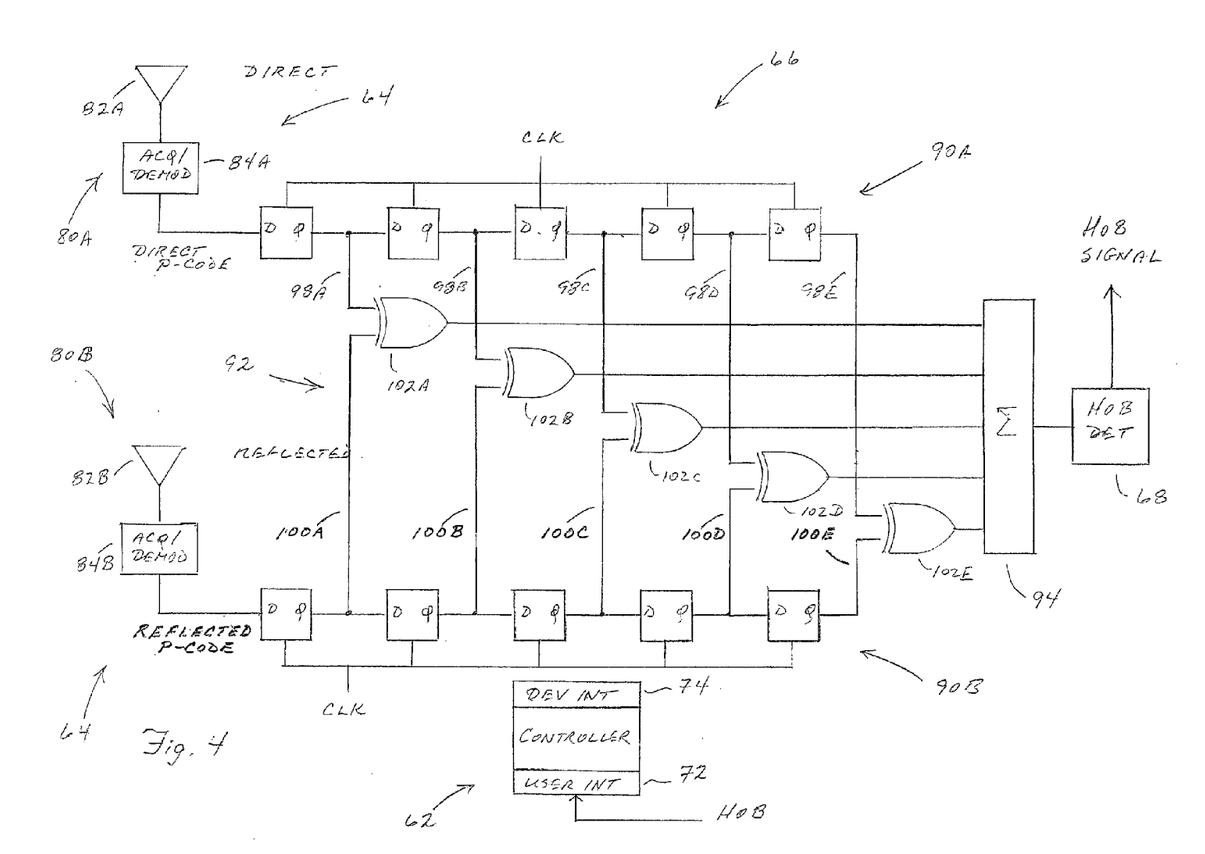
FIG. 4 is a schematic circuit diagram of an embodiment of the fuze system that processes direct and reflected GPS signals from a single GPS satellite for producing a HOB signal to the munition.

With reference to FIG. 4, an embodiment of the circuitry for using a direct GPS signal and a reflected GPS signal to generate a HOB signal, hereinafter HOB circuitry 60, which is or can be associated with an airborne munition is described. More specifically, the HOB circuitry 60 recovers one of the C/A-code and the P-code from the direct and reflected GPS signals received at the munition and processes whichever code is utilized to determine when to issue a HOB signal to cause the munition to detonate or release its payload. The HOB circuitry 60 is generally comprised of: (a) a controller 62, (b) GPS signal acquisition and demodulation circuitry 64, (c) correlation circuitry 66, and (d) HOB detection circuitry 68.

The controller 62 serves to: (a) receive the desired HOB at a user interface 72, (b) instructs the acquisition and demodulation circuitry 64 to acquire the L1 signal or L1 and L2 signals transmitted by at least one GPS satellite in the vicinity of the target, (c) determines the time delay Δt between the direct and reflected GPS signals for the at least one GPS satellite that corresponds to the desired HOB for the munition, (d) provides the correlation circuitry 66 with the time delay Δt or related information that allows the correlation circuitry to produce a correlation signal based on the C/A-code or P-code of the reflected GPS signal and the corresponding C/A-code or P-code of the direct GPS signal delayed by the time delay Δt. The controller 62 communicates with other elements of the HOB circuitry 60 via a device interface 74.

The GPS signal acquisition and demodulation circuitry 64, hereinafter A-D circuitry 64, operates to acquire direct and reflected GPS signals for a particular satellite and demodulate the GPS signals to produce either: (a) direct and reflected C/A-codes or (b) direct and reflected P-codes. In the case in which the A-D circuitry 64 produces direct and reflected C/A-codes, the A-D circuitry 64 is adapted to demodulate direct and reflected L1 signals to produce the direct and reflected C/A-codes. In the case in which the A-D circuitry 64 produces direct and reflected P-codes, there are four possibilities. Namely, the direct and reflected P-codes can be obtained by demodulating: (1) direct and reflected L1 signals, (2) direct and reflected L2 signals, (3) a direct L1 signal and a reflected L2 signal, or (4) a direct L2 signal and reflected L1 signal. It has been found that the use of the P-code results in a more accurate HOB signal. Consequently, the HOB circuitry 60 will be described with respect to the use of the P-code in producing the HOB signal. It should be appreciated, however, that it is also possible to use the C/A-code to produce a HOB signal. With respect to the four possibilities for producing direct and reflected P-codes, the HOB circuitry 60 will be described with respect to the use of a direct L1 signal and reflected L1 signal. It should be appreciated, however, that the direct and reflected P-codes can be obtained using any one of the other three possibilities.

The A-D circuitry 64 is comprised of a direct A-D circuitry 80A and a reflected A-D circuitry 80B. The direct A-D circuitry 80A includes a direct antenna 82A for receiving a direct L1 signal from a GPS satellite and processing circuitry 84A for processing the received L1 signal to produce the direct P-code. Similarly, the reflected A-D circuitry 80B includes a reflected antenna 82B for receiving a reflected L1 signal from the same GPS satellite that is transmitting the L1 signal being processed by the direct A-D circuitry 80A and processing circuitry 84B for processing the received L1 signal to produce the reflected P-code.

The direct antenna 82A preferably is a right-hand circularly polarized antenna to match the right-hand circular polarization of the signals transmitted by GPS satellite. Because the reflection of the right-hand circularly polarized signal transmitted by a GPS satellite by an earth surface reverses the polarization of the signal, the reflected antenna 82B is a left-hand circularly polarized antenna. The use of these circularly polarized antennas produces signals at the outputs of the antennas that are stronger than would be present if such circularly polarized antennas were not utilized. Nonetheless, the use of an antenna that does not match the circular polarization of the signal of interest is feasible. However, the use of a mismatched antenna will produce a loss in the signal-to-noise ratio (SNR) relative to a matched antenna. For example, a linear antenna or, more generally, elliptically polarized antenna can be utilized in place of a circularly polarized antenna. The linear or elliptically polarized antenna having a lower SNR relative to a matching circularly polarized antenna due to polarization mismatch. Further, the direct antenna 82A is tuned to the L1 signal frequency of 1575.42 MHz and the reflected antenna 82B is also tuned to the L1 signal frequency of 1575.42 MHz. Preferably, the direct and reflected antennas 82A, 82B are patch antennas that can be attached to the munition with little, if any, effect on the aerodynamics of the munition. It should, however, be appreciated that a GPS antenna other than patch GPS antennas can be utilized. Other types of antennas that can be used in place of the patch antenna for the direct antenna 82A or the reflected antenna 82 include a slot antenna, a dipole antenna, and other types of antennas known to those in the art. The locations of the direct and reflected antennas 82A, 82B with respect to the munition can vary from munition to munition. Generally, however, the direct antenna 82A is disposed to face upward (i.e., more towards the sky than towards the earth) when receiving the direct GPS signal and the reflected antenna 82B is disposed to face downward (i.e., more towards the earth than the sky) when receiving the reflected GPS signal. Typically, the direct and reflected antennas 82A, 82B are disposed relatively close to one another. As such, the separation of the two antennas typically has little, if any, effect upon the calculation of Δt. If a particular munition or application requires a substantial separation of the direct and reflected antennas 82A, 82B that has an unacceptable effect upon the production of the HOB signal, the equation or equations for determining Δt can be adapted to take into account the separation.

The processing circuitry 84A operates to acquire an L1 signal from a GPS satellite, where the acquired L1 signal will be present when the munition is in the vicinity of the target. Generally, the L1 signal of a GPS satellite with an angle α that is greater than π/4, i.e., a satellite that is well above the horizon in the vicinity of the target, is preferred relative to the L1 signal of a GPS satellite with a lesser, angle α. At least one reason for this preference is that the L1 signal from a GPS with an angle α that is closer to π/2 will produce a reflected signal that has a reflection point (e.g., point 34) that is closer to the target. Another reason for this preference is that the signal from a "high angle" GPS satellite stronger relative to a "lower angle" GPS satellite. This greater signal strength being due to the higher angle GPS satellite being closer to the target than a lower angle GPS satellite. The stronger signal is also less prone to ground absorption and multipath. The processing circuitry 84A provides the navigation signal for the GPS satellite to the controller 62 so that the controller 62 can determine α and then use the determined α and desired HOB to determine Δt for the GPS satellite.

The processing circuitry 84A also operates to demodulate the received L1 signal for the particular GPS satellite to recover the P-code. Various circuit topologies for acquiring the L1 or L2 signal of a GPS satellite and demodulating the L1 or L2 signal to recover the P-code are well-known in the art. An example of one such circuit can be found in "Global Positioning System: Theory and Applications," vols. 1 and 2, Parkinson, B. W., Spilker, J. J. Jr., American Institute of Aeronautics, 370 L'Enfant Promenade, SW, Washington, D.C., 1996, which is incorporated in its entirety by reference. It should, however, be appreciated that the invention is not limited to any particular circuitry for acquiring an L1 or L2 GPS signal or demodulating the acquired L1 or L2 GPS signal to recover whichever of the P-code or C/A code is being utilized to generate a HOB signal.

The processing circuitry 84B operates to acquire the L1 signal for the same GPS satellite for which the processing circuitry 84A operates to acquire the L1 signal. The processing circuitry 84B also operates to demodulate the L1 signal for the particular GPS satellite to recover the P-code. To distinguish the two P-codes from one another, the P-code recovered from the L1 signal by the processing circuitry 84A is referred to as the direct P-code and the P-code recovered from the L1 signal by the processing circuitry 84B is referred to as the reflected P-code.

The correlation circuitry 66 is comprised of a direct tapped delay line 90A comprised of clocked D flip-flops, a reflected tapped delay line 90B also comprised of clocked D flip-flops, an array of exclusive-OR (XOR) gates 92 with each XOR gate in the array performing an exclusive OR operation on a "tapped" signal from the direct tapped delay line 90A and a "tapped" signal from the reflected tapped delay line 90B to produce a mixed signal, and a summer 94 for adding the mixed signals output by the array of XOR gates 92 to produce a correlation signal.

The direct tapped delay line 90A is a delay line with five direct taps 98A-98E. The direct tapped delay line 90A operates so as to sample the direct P-code provided by the processing circuitry 84A, store up to five samples of the direct P-code each delayed by approximately Δt relative to the corresponding reflected P-code sample, update the samples of the direct P-code stored by the direct tapped delay line 90A, i.e., store a new sample and right-shift previously held samples each clock cycle. The direct taps are separated from one another by a delay that is equivalent to the duration of 0.5 chips. Likewise, the reflected taps are separated from one another by 0.5 chips. The controller 62 establishes Δt by controlling when the sampling commences for the direct tapped delay line 90A and the reflected tapped delay line 90B. The reflected tapped delay line 90B is a delay line with five reflected taps 100A-100E. The reflected tapped delay line 90B operates so as to sample the reflected P-code provided by the processing circuitry 84B, store up to five samples of the reflected P-code, update the samples of the reflected P-code stored by the reflected tapped delay line 90B, i.e., store a new sample and right-shift previously held samples each clock cycle. The reflected taps are separated from one another by a delay that is equivalent to the duration of 0.5 chips.

The array of XOR gates 92 is comprised of XOR gates 102A-102E. Each of the XOR gates 102A-102E performs an exclusive-OR operation with respect to the sampled direct P-code signal from one tap of the direct tapped delay line 90A and the sampled reflected P-code signal from the corresponding tap of the reflected tapped delay line 90B. The exclusive-OR operation on the two signals produces an output signal that is indicative of the correlation or degree to which the two signals match. In this regard, the value of the output signal goes low when the two tapped signals are the same and high when the two tapped signals are different. If exclusive-NOR gates are used instead of XOR gates, the output signal goes high when the two taped signals are the same and low when the two tapped signal are different.

It should be appreciated that correlation circuitry could be realized with a direct tapped delay line with one or more taps, a reflected tapped delay line with one or more taps, and an array of one or more XOR gates (or XNOR gates) with each XOR gate (or XNOR gate) performing an exclusive OR operation (or exclusive NOR operation) on the corresponding tapped signals provided by the direct and reflected delay lines. Further, when there are two or more taps associated with each of the direct and reflected delay lines the delay between adjacent taps is not limited to 0.5 chips and need not be the same delay between each pair of immediately adjacent taps in the delay line. Generally, the greater the number of corresponding taps associated with the direct and reflected delays line, the lesser the delay between immediately adjacent taps, and the greater the number of corresponding gates, the greater the resolution and the greater the accuracy of the resulting HOB signal.

The summer 94 receives the mixed signals from the array of XOR gates 92 and sums these mixed signals to produce a correlation signal that is indicative of the degree to which the delayed samples of the direct P-code from the taps 98A-98E correlate with the samples of the reflected P-code from the taps 100A-100E.

The operation of the direct tapped delay line 90A and reflected tapped delay line 90B is clocked. Consequently, the sampled signals provided by the direct taps 98A-98E and the reflected taps 100A-100E are updated at the beginning of a clock cycle to become the current signals that are used by the XOR gates 102A-102E, i.e., whatever sampled signal was previously being provided at a tap is overwritten or discarded in favor of the next sampled signal. The operation of the array of XOR gates 92 and summer 94 are also clocked. As such, the correlation signal output by the summer 94 is a series of discrete values.

The HOB detection circuitry 68 processes the correlation signal output by the summer 94 to determine when to issue a HOB signal that causes the munition to detonate or disperse its payload. The HOB detection circuitry 68 can take several forms. In one embodiment, the HOB detection circuitry 68 includes a differentiator that determines the slope of the curve generated by the sequence of discrete values of the correlation signal produced by the summer 94 and a threshold detector that determines when the slope of this curve changes from a negative slope to a non-negative slope. To elaborate, as the airborne munition moves from a position that is farther from the desired HOB to a position that is closer to the desired HOB, the reflected P-code and the delayed direct P-code become increasing more correlated, i.e., the value of the correlation signal produced by the summer 94 decreases. As such, a curve connecting the discrete values of the correlation signal will have a negative slope. Should the munition pass through the desired HOB and start moving from a position that is closer to the desired HOB to a position that is farther from the desired HOB, the reflected P-code and the delayed direct P-code will become increasing less correlated, i.e., the value of the correlation signal will increase. The curve connecting the discrete value of the correlation signal in this case will have a positive slope. When the threshold detector determines that the differentiator signal has transitioned from a negative slope or value to a non-negative slope or value, the threshold detector issues the HOB signal. An alternative embodiment of the HOB detection circuitry compares the correlation signal output by the summer 94 to a pre-established value. Once the correlation signal become less than or equal to that pre-established value, the HOB signal is issued. If XNOR gates are used, the HOB is issued upon the transition of the curve connecting the discrete values from a positive slope to a non-positive slope. Alternatively, when XNOR gates are used, the HOB detection circuitry can compare the correlation signal output by the summer 94 to a pre-established value and cause the HOB signal to issue if the correlation signal equals or exceeds the pre-established value.

The operation of a munition with the HOB circuitry 60 is described. A desired HOB is provided to the controller 62 via the user interface 72. The desired HOB can be provided to the controller 62 at any time prior to the munition being at the desired HOB, provided there is sufficient time for the HOB circuitry 60 to acquire and process the GPS signals using the HOB circuitry 60. The controller 62 causes the A-D circuitry 64 to acquire the direct and reflected GPS signals from at least one satellite in the vicinity of the target. In this regard, the distance between the location at which a munition with the HOB circuitry 60 is launched and the target may be relatively small and, as such, the HOB circuitry 60 may initiate acquisition prior to launch, at launch, or during launch. In other applications, there may be a significant distance between the location at which the munition with the HOB circuitry 60 is launched and the target. In this case, the HOB circuitry 60 may begin acquisition when the munition is in the vicinity of the target. Further, the munition may also have a navigation system that informs the HOB circuitry 60 as to when to begin the acquisition process.

Once the desired HOB has been provided to the controller 62 and a GPS satellite has been acquired that can provide the direct and reflected GPS signals, the controller 62 can process the navigation message transmitted by the GPS satellite to determine $\alpha$. After determining $\alpha$, the controller 62 can then use the determined $\alpha$ and the desired HOB to determine $\Delta t$ using the appropriate one of equation (39). The use of other equations that employ other geometric/trigonometric relationships and/or approximations is feasible.

Once $\Delta t$ for the particular GPS satellite has been determined, the controller can provide the correlation circuitry 66 with $\Delta t$ and/or other related information that is used by the correlation circuitry 66 to configure the circuitry so that a portion of the sampled direct P-code is delayed by $\Delta t$ relative to a portion of the corresponding sampled reflected P-code, the portion of the delayed direct P-code can be XOR'ed with the corresponding portion of the reflected P-code to provide an indication of the correlation between the two portions. The HOB detection 68 processes the correlation signal output by the summer 94 to determine when to issue the HOB signal that causes the munition to detonate or release its payload.

It should be appreciated that the controller 62 may not need to calculate Δt. To elaborate, the α angle (or θ angle) of the GPS signal associated with a particular GPS satellite and in the vicinity of the target may be known well before the munition is deployed. As such, Δt can be calculated and provided to the controller 62. The controller 62 can then use the calculated Δt to configure the correlation circuitry 66. As such, the desired HOB does not need to be provided to the controller 62.

It should also be appreciated that the GPS signals associated with several satellites can be employed to increase the accuracy of the HOB signal. To elaborate, an embodiment of circuitry for using a direct GPS signal and a reflected GPS signal from each of multiple GPS satellites to generate a HOB signal includes: (a) multiple acquisition and demodulation circuitry each for producing a direct and reflected pseudo-random code based on the direct and reflected GPS signals from a particular one of the multiple GPS satellites that is available when the munition is in the vicinity of the target and (b) multiple correlation circuitry each for producing a correlation signal based on the direct and reflected GPS signals from a particular one of multiple GPS satellites that is available when the munition is in the vicinity of the target. A single pair of antennas, such as the antennas 82A, 82B, can feed the direct and reflected GPS signals to each of the multiple acquisition and demodulation circuitry. Alternatively, a separate pair of antennas can be associated with each one of the multiple acquisition and demodulation circuitry. In this embodiment, the HOB detector can take many forms. In one embodiment, the HOB detector selects one of correlation signals to be used for producing the HOB signal, just as with the HOB detector 68. In another embodiment, the HOB detector employs a "majority rule" circuit when the HOB detector is provided with three or more correlation signals. In this embodiment, each correlation signal is processed to make a determination with respect to that particular correlation signal as to whether the munition is at or near the desired HOB, just as with the HOB detector 68. The majority rule circuitry takes the three or more determinations and further determines whether the majority of the determinations indicate that the munition is at or near the desired HOB and the HOB signal should be issued or not. In another embodiment, the HOB detector employs a weighing circuit when the HOB detector is provided with two or more correlation signals. In this embodiment, each correlation signal is processed to make a determination with respect to that particular correlation signal as to whether the munition is at or near the desired HOB, just as with the HOB detector 68. The weighting circuitry then weights each of the correlation signals. Typically, the greater the α angle (or lesser the θ angle) of the direct and reflected GPS signals processed to obtain a particular correlation signal, the greater the weight accorded to the correlation signal. The weighted correlation signals are then summed and compared to a threshold value. If the sum is equal to or greater than the threshold value, the HOB signal is issued. Otherwise, no HOB signal is issued. Alternatively, if the sum is greater than a threshold value, the HOB signal is issued. Otherwise, no HOB signal if the sum is equal to or less than the threshold value. The calculation of the Δt for each satellite can be done by a controller that is provided with the desired HOB or can be done elsewhere and provided to a controller.

The foregoing description of the invention is intended to explain the best mode known of practicing the invention and to enable others skilled in the art to utilize the invention in various embodiments and with the various modifications required by their particular applications or uses of the invention.

What is claimed is:

1. A munition with a passive height-of-burst (HOB) fuze system comprising:
   a munition;
   a HOB system, operatively attached to the munition, for producing a HOB signal for the munition at a desired HOB, the system comprising:
   GPS signal acquisition and demodulation circuitry for acquiring direct and reflected GPS signals for a particular GPS satellite and demodulating the direct and reflected GPS signals to respectively produce a direct pseudo-random code and a reflected pseudo-random code;
   correlation circuitry for producing a correlation signal indicative of the correlation between the direct pseudo-random code delayed by a period of time related to the desired HOB and the reflected pseudo-random code; and
   HOB detection circuitry for processing the correlation signal to determine when the munition is at or near a desired HOB and, if at or near the desired height, produce an HOB signal.

2. A munition, as claimed in claim 1, wherein the correlation circuitry comprises:
   a first delay line for the direct pseudo-random code, the first delay line having two or more direct taps each for providing a sample of the direct pseudo-random code delayed by the period of time relative to a corresponding sample of the reflected pseudo-random code;
   a second delay line for the reflected pseudo-random code, the second delay-line having two or more reflected taps each for providing a sample of the reflected pseudo-random code;
   an array of logic gates with each logic gate operatively connected to a direct tap and a corresponding reflected tap and producing an output signal indicative of the correlation of the sampled direct pseudo-random code and the sampled reflected pseudo random code; and
   a summer for summing the output signals from each of the logic gates to produce a correlation signal.

3. A munition, as claimed in claim 1, wherein the HOB detection circuitry comprises:
   a differentiator for determining a slope of a curve associated with the correlation signal; and
   a comparator for identifying a transition in the slope of the curve from a negative/positive slope to a non-negative/non-positive slope and producing the HOB signal after identifying the transition.

4. A munition, as claimed in claim 1, wherein the HOB detection circuitry comprises:
   a comparator for comparing the correlation signal to a predetermined value and generating the HOB signal if the correlation signal equals or exceeds the predetermined value.

5. A munition, as claimed in claim 1, wherein the HOB detection circuitry comprises:
   a first input for receiving the correlation signal; and
   a second input for receiving a another correlation signal that relates to a another GPS satellite that is different than the particular GPS satellite.

6. A munition, as claimed in claim 5, wherein the HOB detection circuitry comprises:

a weighting circuit for weighing the correlation signal and the another correlation signal in determining whether to issue the HOB signal.

7. A munition, as claimed in claim 1, wherein the HOB detection circuitry comprises:
at least three inputs, one input for receiving the correlation signal relating to the particular GPS satellite and the other inputs each for receiving a correlation signal associated with a different GPS satellite;
a majority circuit for determining if a majority of the correlation signals indicate that the munition is at or about at the desired HOB.

8. A height-of-burst (HOB) fuze system for use with a munition, the system comprising:
GPS signal acquisition and demodulation circuitry for acquiring a direct signal and reflected GPS signals for a particular GPS satellite and demodulating the direct and reflected GPS signal to respectively produce a direct pseudo-random code and a reflected pseudo-random code;
correlation circuitry for producing a correlation signal indicative of the correlation between the direct pseudo-random code delayed by a period of time related to the desired HOB and the reflected pseudo-random code; and
HOB detection circuitry for processing the correlation signal to determine when the munition is at or near a desired HOB and, if at or near the desired height, produce an HOB signal.

9. A height-of-burst (HOB) fuze system, as claimed in claim 8, wherein: the GPS signal acquisition and demodulation circuitry comprises:
a first antenna for receiving the direct GPS signal; and
a second antenna for receiving the reflected GPS signal.

10. A height-of-burst (HOB) fuze system, as claimed in claim 9, wherein:
each of the first and second antennas is tuned to an L1 carrier frequency.

11. A height-of-burst (HOB) fuze system, as claimed in claim 9, wherein:
the first antenna is tuned to one of an L1 carrier frequency and an L2 carrier frequency; and
the second antenna is tuned to one of an L1 carrier frequency and an L2 carrier frequency.

12. A height-of-burst (HOB) fuze system, as claimed in claim 9, wherein:
the first antenna is a right-hand circularly polarized antenna; and
the second antenna is a left-hand circularly polarized antenna.

13. A height-of-burst (HOB) fuze system, as claimed in claim 8, wherein the correlation circuitry comprises:
a first delay line for the direct pseudo-random code, the first delay line having two or more direct taps each for providing a sample of the direct pseudo-random code delayed by the period of time relative to a corresponding sample of the reflected pseudo-random code;
a second delay line for the reflected pseudo-random code, the second delay-line having two or more reflected taps each for providing a sample of the reflected pseudo-random code;
an array of logic gates with each logic gate operatively connected to a direct tap and a corresponding reflected tap and producing an output signal indicative of the correlation of the sampled direct pseudo-random code and the sampled reflected pseudo random code; and
a summer for summing the output signals from each of the logic gates to produce a correlation signal.

14. A height-of-burst (HOB) fuze system, as claimed in claim 13, wherein the HOB detection circuitry comprises at least one of the following:
a differentiator, a comparator, a weighting circuit, and a majority circuit.

15. A method for determining when a munition is at a desired height-of-burst comprising:
providing a munition;
receiving, at the munition, a direct GPS signal from a satellite;
receiving, at the munition, a reflected GPS signal from the satellite;
delaying the direct GPS signal by a time delay that is representative of the desired height-of-burst to produce a delayed GPS signal;
assessing the correlation of the reflected GPS signal and the direct GPS signal delayed by the time delay; and
providing, at the munition, a HOB signal if there is a high degree of correlation between the reflected GPS signal and the direct GPS signal delayed by the time delay.

16. A method, as claimed in claim 15, further comprising:
using a desired HOB and one of an angle $\alpha$ and $\theta$, each associated with the direct and reflected GPS signals from the satellite, to determine the time delay.

17. A method, as claimed in claim 15, wherein:
the step of delaying occurring at the munition.

18. A method, as claimed in claim 15, wherein:
the step of assessing occurring at the munition.

* * * * *